(12) United States Patent
Pedersen

(10) Patent No.: US 9,438,091 B2
(45) Date of Patent: Sep. 6, 2016

(54) PERMANENT MAGNET MACHINE WITH TWO STATORS

(75) Inventor: Kenneth Pedersen, Hjoerring (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1059 days.

(21) Appl. No.: 13/224,477

(22) Filed: Sep. 2, 2011

(65) Prior Publication Data

US 2012/0074707 A1    Mar. 29, 2012

(30) Foreign Application Priority Data

Sep. 24, 2010   (EP) .................................. 10179275

(51) Int. Cl.
*H02K 16/04* (2006.01)
*H02K 16/00* (2006.01)
*H02K 7/18* (2006.01)
*H02K 29/03* (2006.01)

(52) U.S. Cl.
CPC ............ *H02K 16/00* (2013.01); *H02K 7/1838* (2013.01); *H02K 16/04* (2013.01); *H02K 29/03* (2013.01); *Y02E 10/725* (2013.01)

(58) Field of Classification Search
CPC .................................................... H02K 16/04
USPC ...... 310/112; 290/44, 55, 4 A, 40 C; 322/24, 322/28, 20
See application file for complete search history.

(56) References Cited

U.S. PATENT DOCUMENTS

| | | | |
|---|---|---|---|
| 4,177,414 A | * | 12/1979 | Roesel et al. .................... 322/28 |
| 5,691,590 A | * | 11/1997 | Kawai et al. .................. 310/180 |
| 6,401,849 B1 | * | 6/2002 | Seguchi et al. .............. 180/65.6 |
| 7,843,102 B1 | | 11/2010 | Wyremba |
| 2001/0020805 A1 | * | 9/2001 | Nakano et al. ................ 310/112 |
| 2002/0093266 A1 | * | 7/2002 | Buening et al. .............. 310/198 |
| 2006/0244332 A1 | * | 11/2006 | Wyremba ..................... 310/179 |
| 2009/0195127 A1 | * | 8/2009 | Lin ............................. 310/75 C |
| 2010/0045047 A1 | * | 2/2010 | Stiesdal ........................... 290/55 |

FOREIGN PATENT DOCUMENTS

| | | |
|---|---|---|
| CN | 1249895 C | 4/2006 |
| CN | 100468922 C | 3/2009 |
| CN | 101655070 A | 2/2010 |
| CN | 101677195 A | 3/2010 |
| EP | 1220426 A2 | 7/2002 |
| EP | 1995855 A2 | 11/2008 |
| EP | 2164154 A1 | 3/2010 |
| JP | 2007174733 A | 7/2007 |
| WO | WO 0215367 A1 | 2/2002 |

OTHER PUBLICATIONS

JP 2007174733 A (Jul. 2007) Nakano et al. English Translation.*

* cited by examiner

*Primary Examiner* — Quyen Leung
*Assistant Examiner* — Robert E Mates

(57) ABSTRACT

A permanent magnet machine includes two stationary stators and a rotating rotor. Electromagnetic fields occurring in one stator are displaced by an angle of thirty electrical degrees with respect to electromagnetic fields occurring in the other stator due to currents fed to the stators.

4 Claims, 2 Drawing Sheets

PERMANENT MAGNET MACHINE WITH TWO STATORS

CROSS REFERENCE TO RELATED APPLICATIONS

This application claims priority of European Patent Application No. 10179275.2 EP filed Sep. 24, 2010, which is incorporated by reference herein in its entirety.

FIELD OF INVENTION

The present invention relates in general to a permanent magnet machine with two stators. In particular, the present invention is directed to a generator of a wind turbine and a wind turbine with a permanent magnet machine with two stators.

BACKGROUND OF INVENTION

Due to variation in magnetic forces within rotating permanent magnet machines pulsations of torque occur. The torque pulsations occur at no-load and load situations, hereafter denoted cogging torque and ripple torque, respectively. These torque pulsations may lead to vibrations which can be harmful to the rotating machine and interconnected parts. Furthermore, the torque pulsations can create acoustic noise of low frequency which can disturb the environment. In addition to the torque pulsations caused by tangential forces, radial forces exist creating practically the same problems and at the same frequencies. These issues can be even more pronounced in direct drive wind generators.

Several techniques exist to reduce cogging and ripple torque as well as radial force. The most common are pole shifting, magnet shaping, tooth shaping (including dummy slots) and skew. These techniques have the drawback that the average torque is reduced for a given level of current. Thus, current needs to be increased in order to provide the same torque. Similarly, active ripple reduction can be carried out by superimposing harmonics in the current. This will lead to increased copper losses as well.

SUMMARY OF INVENTION

It is an object of the present invention to reduce force pulsations in permanent magnet machines.

This object is solved by a permanent magnet machine, a generator and a wind turbine as claimed in the independent claims. The dependent claims offer further details and advantages of the claimed invention.

First, the theoretical background of the invention is contemplated. In order to describe the invention properly, the explanation sets off from pole shifting and step skew which is first explained: The radial and tangential force pulsations are highly dominated by the $6^{th}$ harmonic. Thus, by cancelling the $6^{th}$ harmonic by opposing forces, a significant reduction in these forces is obtained. In theory, the $6^{th}$ harmonic can be completely cancelled by having the $6^{th}$ harmonic produced by one end of the generator in opposite phase of the $6^{th}$ harmonic produced by the other end of the generator. From a tangential force perspective this is can be understood since the total torque of the generator is the sum of torques created by subparts of the generator. From a radial force perspective this cancels the radial buckling excitation though it may introduce some buckling along axial direction. However, the axial buckling modes are not as dominant as the radial buckling modes since the diameter is somewhat greater than the length, so overall the design would be improved also with respect to vibrations caused by the radial force.

Cancelling the $6^{th}$ harmonic can be done either by stator or rotor skew. To simplify the explanation we will limit the explanation to rotor skew. By shifting the magnets by 30° electrical in one end of the generator, the fields in that end are delayed a half $6^{th}$ harmonic period meaning that the total $6^{th}$ harmonic torque contribution cancels to zero. 3d-effects and non-ideal production will create less cancellation in real life, the principle however works. This method is denoted step skew (in this case only 2 steps) in contrast to continuous skew.

A similar effect as skew can be approximated by using pole shifting. This is advantageous to skew in that there are no force variations along the axis of the machine, thus avoiding axial buckling modes. In pole shifting only some of the magnet poles are shifted a given angle, but in the whole axial length.

In contrast to this, when using step skew all magnet poles are shifted the same amount of degrees but the shift depends on the position along the axial length. The simplest step skew is thus to have the rotor divided into two parts in the axial direction: The front and the back. The drawback of this method is that the induced back-EMF's (EMF: electromagnetic field) of the two ends are not in phase, resulting in a lower total back EMF and thus lower torque. The reason for this is, that the two back-EMF's are inducing voltage into the same circuit where the vector sum will be less than the sum of amplitudes, due to the phase displacement. A similar loss of back-EMF and thus average torque is present when using pole shifting.

The current invention introduces a machine without loss of average torque. One rotor covers two stators fed by currents (e.g. from two inverters) being out of synch by 30° electrical. Similarly the stators are twisted 30° electrical. Alternatively the stators can be aligned but the magnets are twisted 30° electrical in the front relative to the magnets on the back. Thus the optimal angle between magnets and magnetic field is maintained in each half of the machine, meaning no loss of average torque unlike standard pole shifting and skew techniques.

In one aspect the invention is directed to a permanent magnet machine with two stationary stators and a rotating rotor, wherein electromagnetic fields occurring in one stator are displaced by an angle of thirty electrical degrees with respect to electromagnetic fields occurring in the other stator and wherein currents fed to the stators are displaced by thirty electrical degrees to each other.

It is not important whether the physical displacement is on the rotor side or on the stator side, or a combination. Of importance is that the fields occurring within each stator are displaced half a cogging period in time corresponding to 30° electrical. Also, it does not matter whether the rotor is exterior or interior. The invention may also be realised with two rotors on the same shaft, resulting in two generators on the same shaft. If the invention is realized as two generators on the same shaft, the two generators do not need to be identical if they have approximately the same torque harmonics. They do not even need the same power level or current amplitude. If it is chosen to go for smaller machines opposing the torque pulsations, it may be advantageous to have two smaller machines in each end and the main generator in the centre to minimize 3d torque pulsations along the axial length.

The stators may be displaced by an angle of thirty electrical degrees with respect to each other. In order to achieve the displacement of the electromagnetic fields occurring in the stators the whole stators may be twisted relative to each other.

Magnets of the rotor in the area of one stator may be displaced by an angle of thirty electrical degrees with respect to magnets in the area of the other stator. In order to achieve the displacement of the electromagnetic fields occurring in the stators certain magnets or the rotor can be shifted.

The permanent magnet machine may include two inverters for supplying the displaced currents. The two inverters lead to a fault tolerant generator, i.e. to a generator which is capable of continuing at a lower loading, if one generator or inverter is faulted. During a fault the reduction of general force pulsations will partly disappear but the cogging reduction will be maintained completely. The reduced force reduction can thus be accepted for the limited period of time it takes to repair the permanent magnet machine. It may also be beneficial when trying out new concepts, making it possible to scale up quickly a prototype with existing components, e.g. creating a 6 MW turbine with two 3 MW generators on the same shaft.

The two stators may be arranged in an axial direction of a shaft to which the rotor or the stators are attached. The most beneficial arrangement of the stators is the axial arrangement as this is easy to realise.

One rotor may be provided for each stator. With two rotors two magnetic machines are arranged on the shaft. A generator can then be designed as a modular system using identical or different generators to achieve the desired output. This solution offers high flexibility.

In a second aspect the invention is directed to a generator for a wind turbine including a permanent magnet machine according as described above. Generators for wind turbines profit to a great extent from the reduced force pulsations and thereby reduced vibrations as the generator sits on top of a high tower. This arrangement is susceptible to vibrations.

In a further aspect the invention is directed to a wind turbine with a tower, a main shaft connected therewith, a blade hub rotatively connected via a main bearing to the main shaft and blades connected to the blade hub including a generator as described above. Wind turbines profit to a great extent from the reduced torque pulsations and thereby reduced vibrations as the generator sits on top of a high tower. This arrangement is susceptible to vibrations.

The wind turbine may include an inner stator attached to the main shaft and an outer rotor attached to the blade hub. Wind turbines of the outer rotor type are quite common. However, the invention can be employed in outer stator wind turbines as well.

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

DETAILED DESCRIPTION OF INVENTION

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
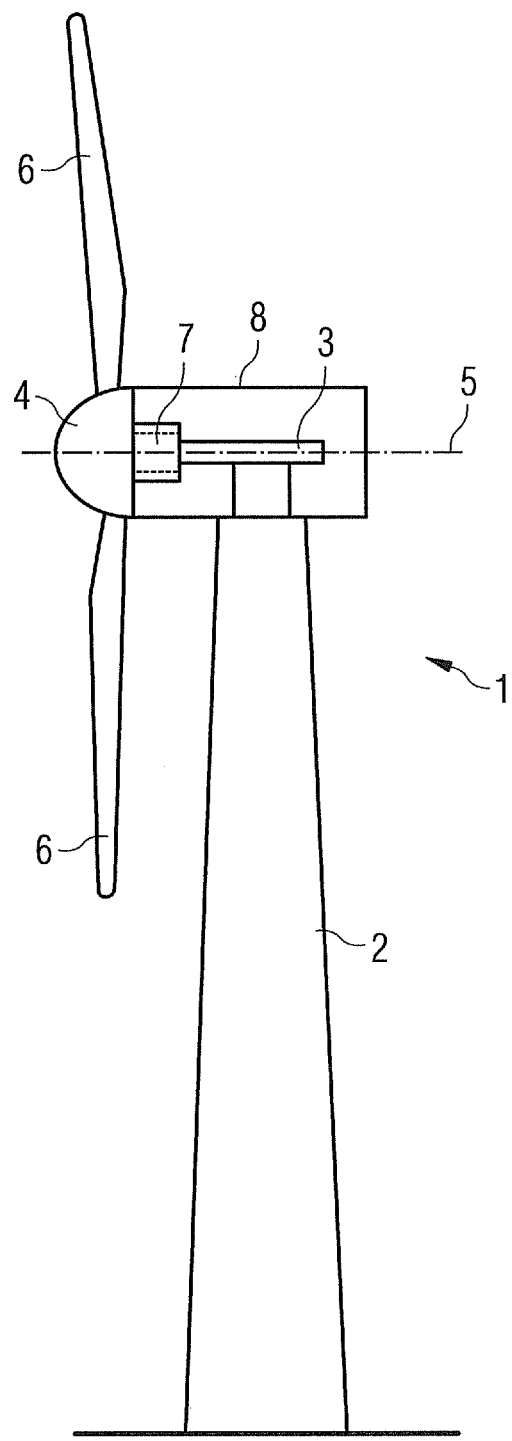
FIG. 1 illustrates a schematic view of a wind turbine with a generator.

FIG. 1 shows a wind turbine 1 with a tower 2 fixed to the ground. The tower 2 can have a height of hundred meters and more. On top of the tower 2 a main shaft 3 is fixed. A blade hub 4 is rotatively attached to the main shaft 3 and rotates around an axis of rotation 5 which is the centre axis of the main shaft 3. Blades 6 are attached to the blade hub 4. A direct-drive generator 7 is provided inside a nacelle 8 which surrounds the main shaft 3 and electrical equipment of the wind turbine 1.

Figure 2:
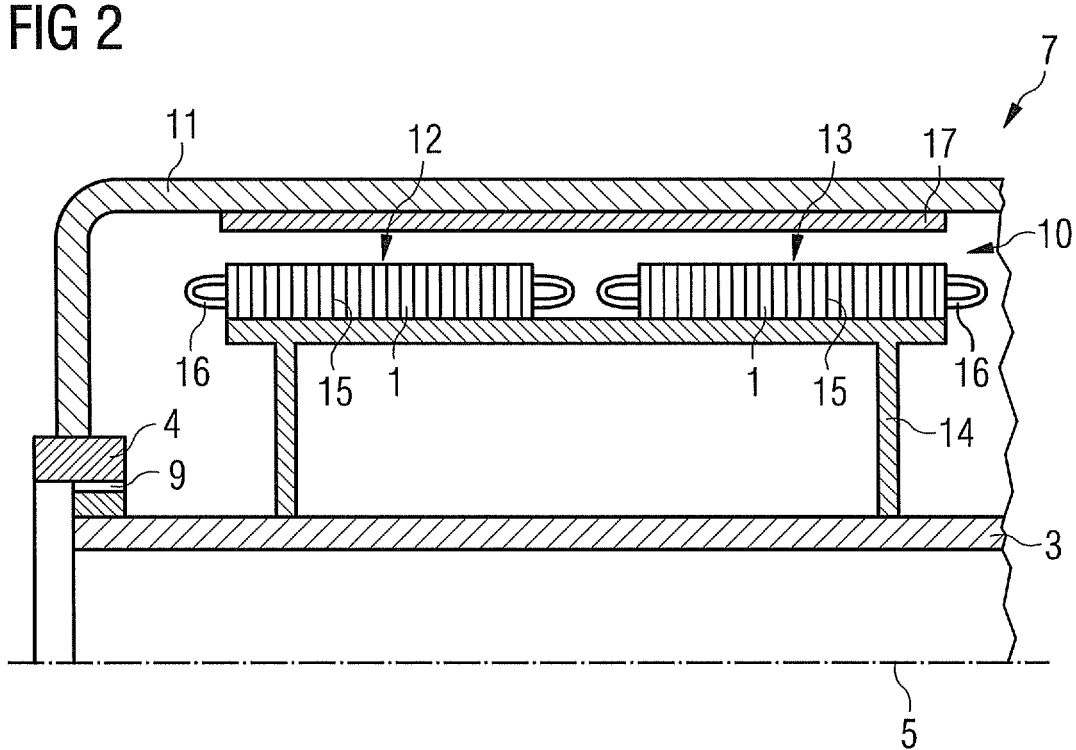
FIG. 2 illustrates a schematic cross-sectional view of a generator.

FIG. 2 shows part of the wind turbine 1 where the generator 7 is located. In conjunction with FIG. 2 the mechanical structure of the generator is explained. The electrical structure is explained in conjunction with FIG. 3. In the Figures, the invention is explained by means of a wind turbine generator. However, the invention applies to all permanent magnet machines, not just generators for wind turbine applications.

The blade hub 4 is rotatively connected with the fixed main shaft 3 by a main bearing 9. The rotating part of the bearing 9 is fixed to the blade hub 4 directly or to a mounting ring (not shown). The stationary part of the bearing is fixed to an outside of the main shaft 3. A rotating rotor 10 of the generator 7 is fixed to a cylindrical rotor holding structure 11 of the blade hub 4. A first stator 12 and a second stator 13 are arranged on a ring shaped stator support structure 14 which is connected to an outside of the main shaft 3. The stators 12, 13 are arranged in axial direction. The numbering of the stators 12 and 13 is only chosen for ease of identification.

The stators 12, 13 each comprise a lamination stack 15 which supports windings 16 of the stators 12, 13. A small gap between the two stators 12 and 13 prevents contact between the windings 16 and eases assembly and disassembly of the stators 12, 13. As the windings 16 can be electrically insulated direct contact of the windings 16 of the two stators 12 and 13 is possible to reduce the axial length of the generator 7 for example.

The rotor 10 comprises a plurality of permanent magnets 17 which are mounted to the rotor holding structure 11 or inside a hollow cylinder (not shown). The permanent magnets 17 are arranged opposite to the lamination stacks 15 and the supported windings 16. The length of the rotor 10 in axial direction corresponds roughly to the axial length of both stators 12 and 13. An air gap with a width of approximately a few millimeters is located between the permanent magnets 17 and the lamination stacks 15.

Figure 3:
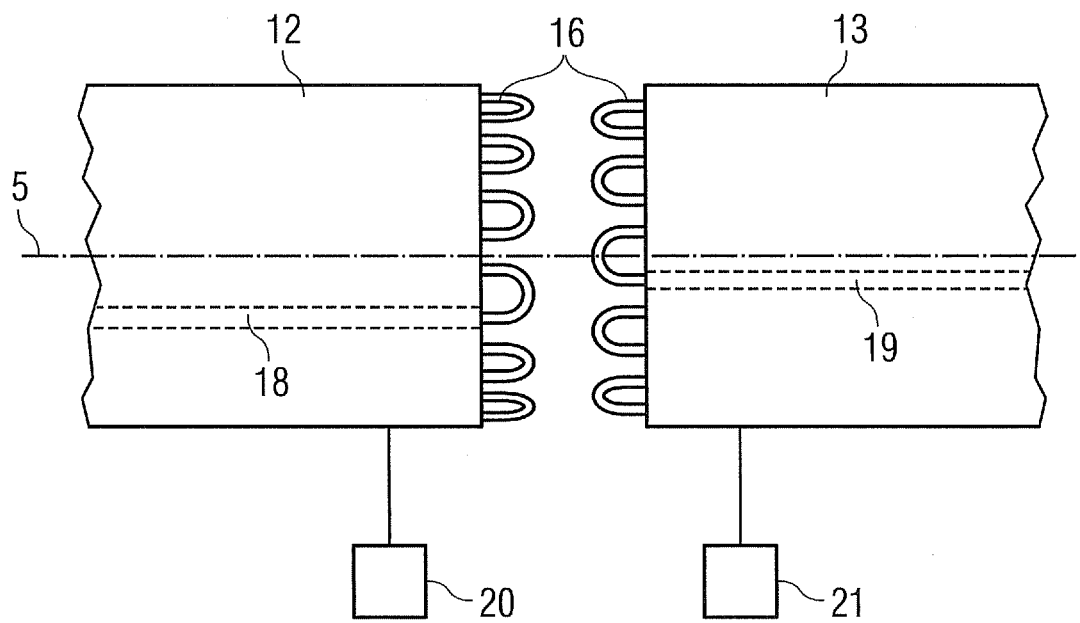
FIG. 3 illustrates a schematic top view of a generator.

FIG. 3 shows a top view of the stators 12 and 13. A first axial slot 18 of the first stator 12 accommodates one or more windings 16 or part of them. A second axial slot 19 of the second stator 13 accommodates one or more windings 16 or part of them. These two slots 18 and 19 are shown as examples. The surfaces of the stators 12 and 13 are covered with several slots.

The two slots 18 and 19 are displaced by an angle of thirty electrical degrees with respect to each other. By means of the two slots 18 and 19 the displacement of the two stators 12 and 13 can be shown best. The windings 16 and the complete stators 12 and 13 are displaced by an angle of thirty electrical degrees with respect to each other. However, most important is that the electromagnetic fields occurring in the stators are displaced by an angle of thirty electrical degrees with respect to each other. The shift between the two stators 12 and 13 is only one measure to achieve the displacement of the electromagnetic fields. Further measures like for example displacement of a part of the rotor's magnets have already been discussed.

The displacement of the electromagnetic fields of one stator 12 with regard to the other stator 13 is one part of the layout of the invention. The other part is the feeding of the currents to the stators 12, 13.

A first inverter or current source 20 provides current for the windings 16 of the first stator 12. A second inverter or current source 21 provides current for the windings 16 of the second stator 13. The currents provided by the two inverters 20 and 21 are displaced by thirty electrical degrees to each other.

The displacement of the stators 12 and 13 to each other by 30 degrees electrical and the displacement of the currents fed to the windings 16 of the stators 12 and 13 to each other by 30 degrees electrical ensures that the fields occurring within each stator 12, 13 are displaced half a cogging period in time corresponding to 30 degrees electrical. This suppresses pulsations of torque and radial force and therewith vibrations in the permanent magnet machine like the shown generator 7.

The invention claimed is:

1. A wind turbine generator, comprising:
a first stator and a second stator arranged next to each other in an axial direction on a ring shaped stator support structure connected to a main shaft, each of the first stator and second stator including a corresponding lamination stack and corresponding windings;
a rotor fixed to a rotor holding structure,
a first inverter and a second inverter, each of which connected to the respective windings of the first stator and the second stator,
wherein the first and second stators are arranged within the rotor holding structure,
wherein the rotor comprises permanent magnets mounted opposite to the lamination stacks of the first and second stators on the rotor holding structure, the permanent magnets having a length in the axial direction that corresponds to the added axial lengths of the two stators,
wherein electromagnetic fields occurring in the first stator are displaced by an angle of thirty electrical degrees with respect to electromagnetic fields occurring in the second stator, and
wherein currents fed by the first and second inverters to the respective windings of the first and second stators are displaced by thirty electrical degrees to each other.

2. The wind turbine generator according to claim 1, wherein the first and second stators are displaced by an angle of thirty electrical degrees with respect to each other.

3. A wind turbine, comprising:
a tower;
a main shaft connected to the tower;
a blade hub rotatively connected via a main bearing to the main shaft;
blades connected to the blade hub; and
a wind turbine generator according to claim 1 connected to the main shaft.

4. The wind turbine according to claim 3, wherein the first and second stators are attached to the main shaft, and wherein the rotor is attached to the blade hub.

* * * * *